United States Patent
Maeda et al.

(10) Patent No.: US 9,623,734 B2
(45) Date of Patent: Apr. 18, 2017

(54) SUNROOF STRUCTURE FOR AUTOMOBILE

(71) Applicants: Nissan Motor Co., Ltd., Kanagawa (JP); WEBASTO SE, Stockdorf (DE)

(72) Inventors: Tomokazu Maeda, Kanagawa (JP); Kozo Ohdoi, Hiroshima (JP); Takashi Sasaki, Hiroshima (JP); Toru Shibue, Hiroshima (JP)

(73) Assignees: NISSAN MOTOR CO., LTD., Kanagawa (JP); WEBASTO SE, Stockdorf (DE)

( * ) Notice: Subject to any disclaimer, the term of this patent is extended or adjusted under 35 U.S.C. 154(b) by 0 days.

(21) Appl. No.: 15/022,587

(22) PCT Filed: Sep. 17, 2014

(86) PCT No.: PCT/JP2014/004770
§ 371 (c)(1),
(2) Date: Mar. 17, 2016

(87) PCT Pub. No.: WO2015/040858
PCT Pub. Date: Mar. 26, 2015

(65) Prior Publication Data
US 2016/0229273 A1   Aug. 11, 2016

(30) Foreign Application Priority Data
Sep. 17, 2013   (JP) ................. 2013-191317

(51) Int. Cl.
*B60J 7/043*   (2006.01)
*B60J 7/00*    (2006.01)
(Continued)

(52) U.S. Cl.
CPC .......... *B60J 7/0084* (2013.01); *B60J 7/043* (2013.01); *B60J 7/05* (2013.01); *B60J 10/82* (2016.02); *B60J 10/90* (2016.02); *B62D 25/06* (2013.01)

(58) Field of Classification Search
CPC ...................................... B60J 7/0084
(Continued)

(56) References Cited

U.S. PATENT DOCUMENTS 6,837,538 B2 * 1/2005 Itoh .................. B60J 10/82
                                                  296/213
8,720,987 B2   5/2014 Ohdoi et al.
(Continued)

FOREIGN PATENT DOCUMENTS

JP   2006327284 A   12/2006
WO   2012/076967 A1   6/2012

*Primary Examiner* — Dennis H Pedder
(74) *Attorney, Agent, or Firm* — Osha Liang LLP

(57) ABSTRACT

A sunroof structure for a vehicle has a left side frame disposed on a left side of a vehicle body roof, extending along a vehicle front-rear direction, a right side frame disposed on a right side of the vehicle body roof, extending along the vehicle front-rear direction, a roof panel disposed between the left side frame and the right side frame, having a sunroof opening, a sunroof disposed in the sunroof opening and having at least two glass panels arranged next to each other in the vehicle front-rear direction, in which at least a foremost glass panel of the at least two glass panels is configured to be openable and closeable, and a sunroof side rail disposed below a peripheral portion of the sunroof opening, extending along the vehicle front-rear direction, and having a drain groove and a drain portion configured to discharge water accumulated in the drain groove.

6 Claims, 6 Drawing Sheets

(51) Int. Cl.
*B60J 7/05* (2006.01)
*B62D 25/06* (2006.01)
*B60J 10/82* (2016.01)
*B60J 10/90* (2016.01)

(58) Field of Classification Search
USPC ....... 296/215, 203.03, 213, 210, 216.01–224
See application file for complete search history.

(56) References Cited

U.S. PATENT DOCUMENTS

| | | | |
|---|---|---|---|
| 8,770,657 B2 * | 7/2014 | Shirai | B62D 25/07 |
| | | | 296/203.03 |
| 8,807,638 B2 * | 8/2014 | Schroferl | B62D 25/06 |
| | | | 296/213 |
| 2014/0042778 A1 | 2/2014 | Ohdoi et al. | |
| 2015/0306941 A1 * | 10/2015 | Dayoub | B60J 7/047 |
| | | | 296/213 |

* cited by examiner

SUNROOF STRUCTURE FOR AUTOMOBILE

CROSS-REFERENCE TO RELATED APPLICATIONS

The present application is a national stage application of PCT/JP2014/004770 filed Sep. 17, 2014, which claims priority to Japanese Patent Application No. 2013-191317 filed on Sep. 17, 2013, the disclosures of which are hereby incorporated herein by reference in their entirety.

BACKGROUND

Technical Field

The present invention relates to a sunroof structure for an automobile.

Related Art

Conventionally, there has been known a sunroof structure in which a sunroof opening is formed in a roof panel and a sunroof is provided in the sunroof opening (see Japanese Patent Application Publication No. 2006-327284).

SUMMARY

In the aforementioned sunroof structure described in Japanese Patent Application Publication No. 2006-327284, a lateral frame portion which is a reinforcement member is laid on a vehicle rear side of the sunroof opening to extend along a vehicle width direction. Generally, paired left and right sunroof side rails are disposed below the lateral frame portion to extend in the vehicle front-rear direction. When rainwater and the like on the roof panel falls from a peripheral portion of the sunroof opening toward the inside of the vehicle, the rain water and the like is received by the sunroof side rails and then discharged to the outside of the vehicle via drain portions provided in the sunroof side rails.

When the size of the sunroof opening is increased along the vehicle front-rear direction, the stiffness of the roof panel is reduced. In view of this, a roof panel having a large sunroof opening is reinforced in some cases by disposing a lateral frame portion traversing an intermediate portion, in the front-rear direction, of the sunroof opening in a vehicle plan view. In this case, rain water and the like on the roof panel may fall not on the sunroof side rails but on the lateral frame portion and run down the lateral frame portion to fall into the vehicle cabin. Hence, such a sunroof structure has deterioration in waterproofness.

A sunroof structure for a vehicle according to one or more embodiments of the present invention maintains a high level of waterproofness in a case of disposing a reinforcement member such as a lateral frame portion traversing a sunroof opening in a vehicle plan view.

According to one or more embodiments of the present invention, a sunroof structure for a vehicle comprises a left side frame disposed on a left side of a vehicle body roof, extending along a vehicle front-rear direction, a right side frame disposed on a right side of the vehicle body roof, extending along the vehicle front-rear direction, a roof panel disposed between the left side frame and the right side frame, comprising a sunroof opening, a sunroof disposed in the sunroof opening and comprising at least two glass panels arranged next to each other in the vehicle front-rear direction, in which at least a foremost glass panel of the at least two glass panels is configured to be openable and closeable; a sunroof side rail disposed below a peripheral portion of the sunroof opening, extending along the vehicle front-rear direction, and comprising a drain groove and a drain portion configured to discharge water accumulated in the drain groove to an outside of the vehicle, a reinforcement member disposed along a vehicle width direction between the sunroof side rail and a rearmost glass panel of the at least two glass panels, which connects the left side frame to the right side frame, and a drain member disposed between the peripheral portion of the sunroof opening and the reinforcement member, which receives water falling from the peripheral portion of the sunroof opening toward an inside of a vehicle cabin of the vehicle, and causes the water to flow to the drain groove of the sunroof side rail.

DETAILED DESCRIPTION

Embodiments of the present invention are described below in detail with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
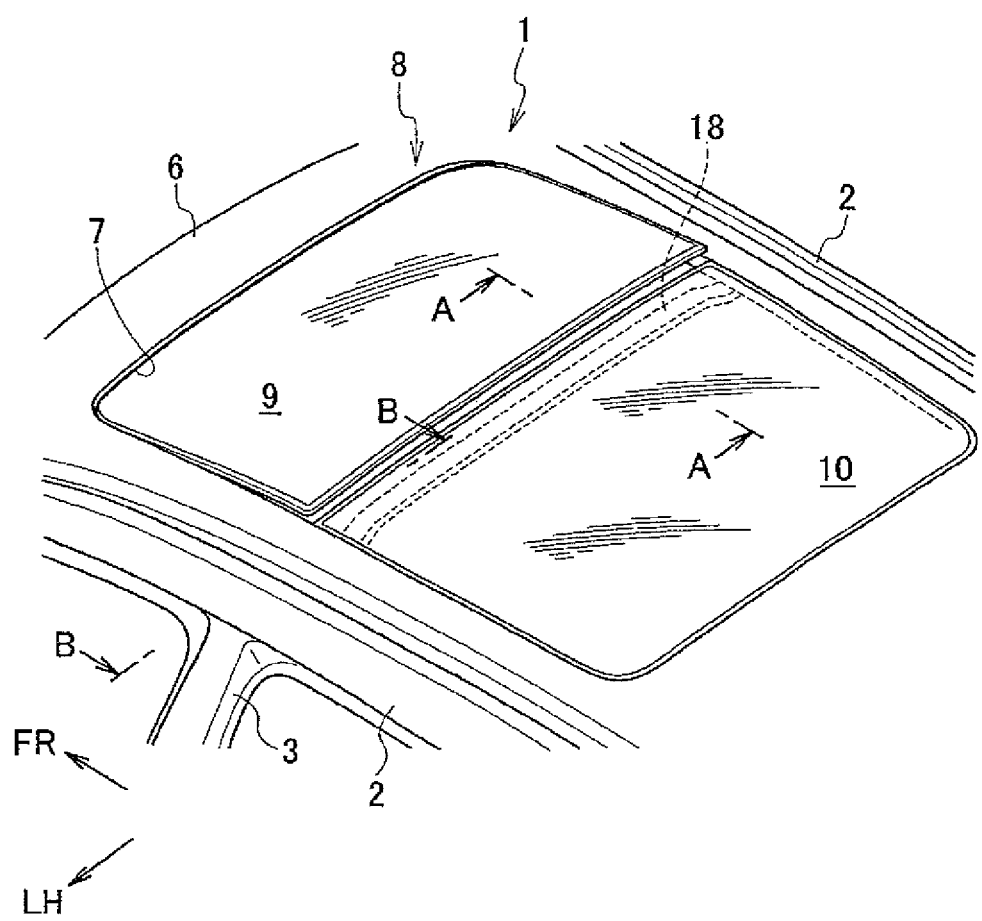
FIG. 1 is a perspective view of a portion around a sunroof in a vehicle body upper portion according to one or more embodiments of the present invention as viewed in an oblique forward direction from a rear-left side of the vehicle.

As shown in FIG. 1, paired side frames 2, 2 extending along a vehicle front-rear direction are disposed respectively in left and right side portions of a vehicle body roof 1. The side frames 2 are stiff vehicle body frame members and upper end portions of center pillars 3 extending in a vehicle up-down direction are joined respectively to the side frames 2. Specifically, the side frames 2 are each formed to have a closed cross-section structure formed of a roof side rail inner 4 and a roof side rail outer 5 (see FIG. 3). Moreover, a roof panel 6 forming the vehicle body roof 1 is disposed between the left and right side frames 2, 2. A sunroof opening 7 which has a rectangular shape in a vehicle plan view (top view) is formed in the roof panel 6 and a sunroof 8 made of a transparent glass is disposed in the sunroof opening 7. In a first embodiment, the sunroof opening 7 is relatively large. The center pillars 3 are disposed in an intermediate portion of the sunroof opening 7 in the front-rear direction in a vehicle side view. Moreover, the sunroof 8 includes two glass panels arranged next to each other in the vehicle front-rear direction. A glass panel on the front side (hereafter, referred to as front glass panel) is configured to be an openable-closeable type which can be opened and closed, and a glass panel on the rear side (hereafter, referred to as rear glass panel) is configured to be a fixed type which cannot be opened and closed. The front glass panel 9 and the rear glass panel 10 are each formed in a curved shape protruding upward in a vehicle front view (and in a vehicle rear view) (see FIG. 3). Furthermore, the front glass panel 9 is configured to be a sliding type which can move downward and then slide toward the rear of the vehicle. However, the front glass panel 9 may be configured to be a sliding type which can move upward and then slide toward the rear of the vehicle or may be configured to be a tilt-up type.

Figure 2:
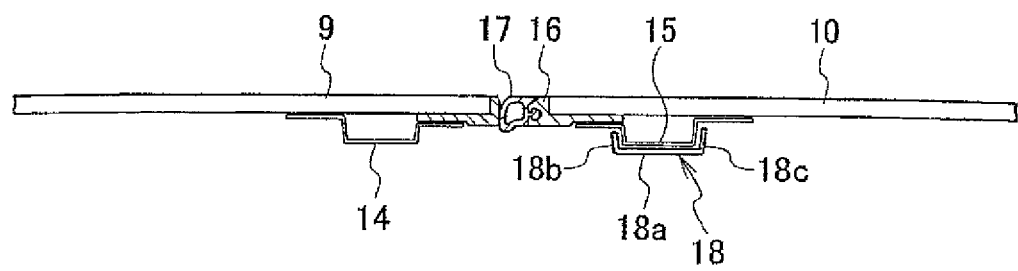
FIG. 2 is a cross-sectional view showing a first embodiment and taken along the line A-A of FIG. 1.

Moreover, as shown in FIG. 2, a rectangular frame-shaped front glass panel frame 14 is attached to a bottom surface of the front glass panel 9, along a peripheral portion of the front glass panel 9. In the first embodiment, the front glass panel frame 14 is formed in a hat-shaped cross section protruding downward and is fixedly attached to the bottom surface of the front glass panel 9. Meanwhile, a rectangular frame-shaped rear glass panel frame 15 is attached to a bottom surface of the rear glass panel 10, along a peripheral portion of the rear glass panel 10. In the first embodiment, the rear glass panel frame 15 is formed in a hat-shaped cross section protruding downward and is fixedly attached to the bottom surface of the rear glass panel 10. Furthermore, a seal retainer 16 is fitted along an entire periphery of an outer peripheral portion of the rear glass panel 10. The seal retainer 16 holds a seal (weather strip) 17 and the seal 17 seals a gap between the seal retainer 16 and the front glass panel 9 and a gap between the seal retainer 16 and the sunroof opening 7.

Figure 3:
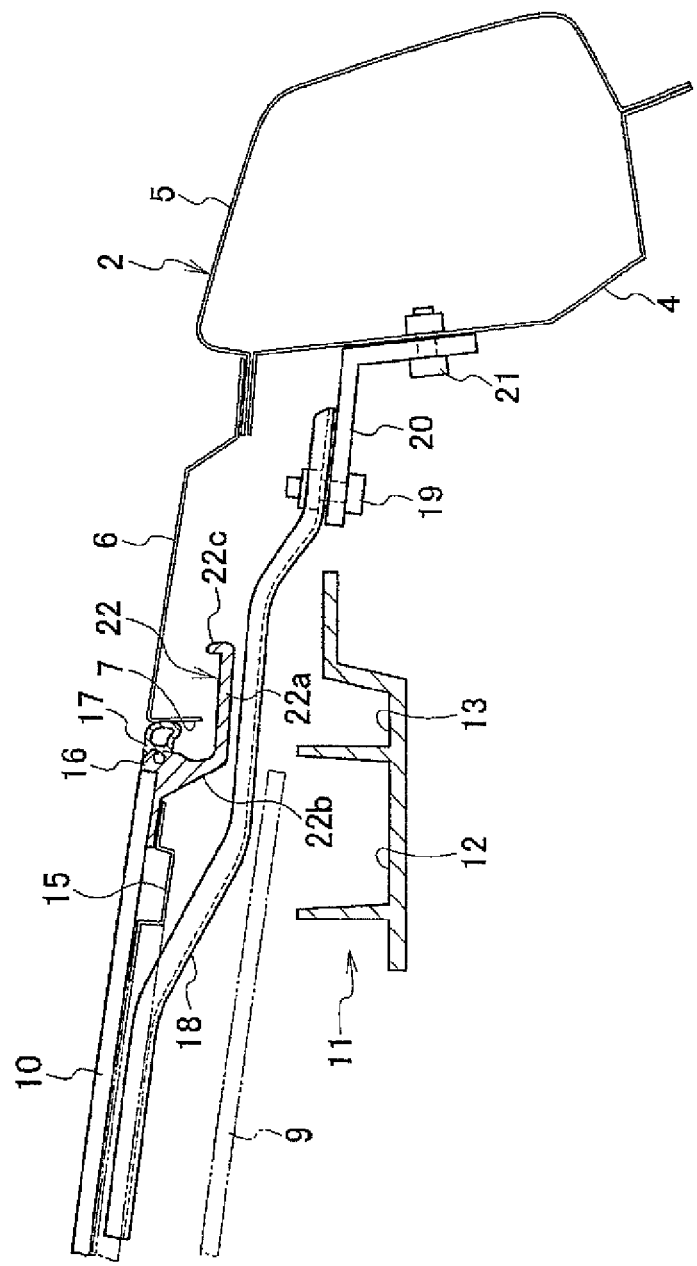
FIG. 3 is a cross-sectional view showing the first embodiment and taken along the line B-B of FIG. 1.
Figure 4:
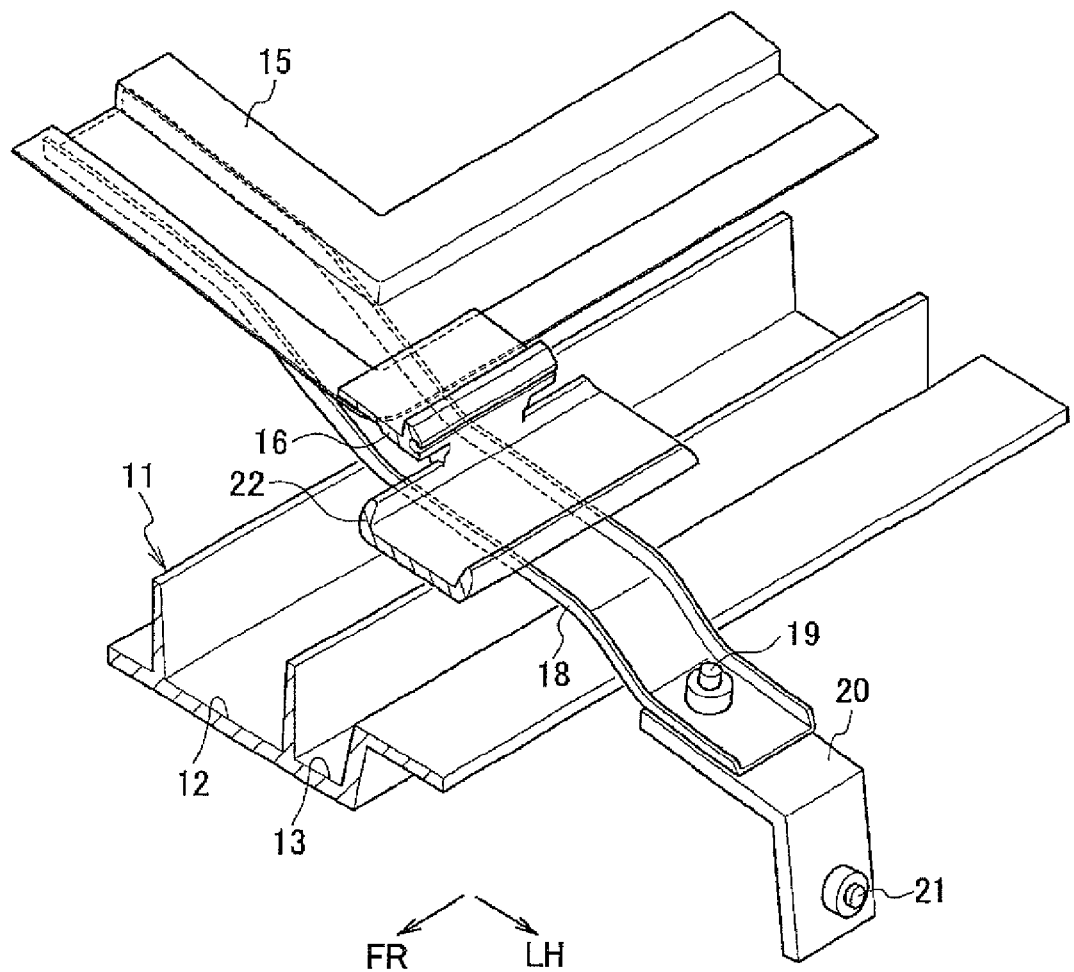
FIG. 4 is a perspective view which shows the first embodiment and in which a portion near a front edge portion of a drain member is cut away.
Figure 5:
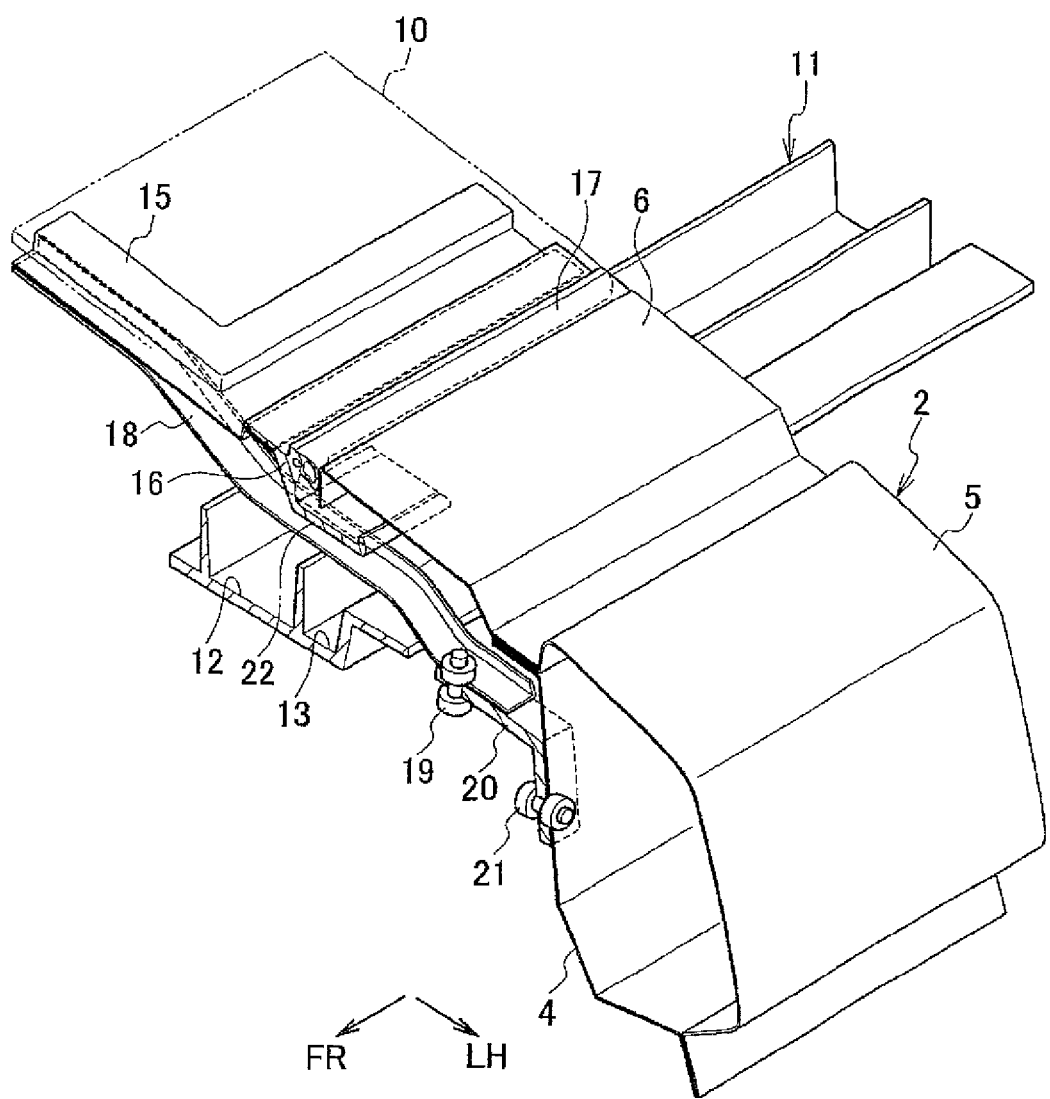
FIG. 5 is a perspective view which shows the first embodiment and in which a portion near a front edge portion of a rear glass panel is cut away.

Then, as shown in FIGS. 3 to 5, paired left and right sunroof side rails 11, 11 are provided below the peripheral portion of the sunroof opening 7 to extend along the vehicle front-rear direction. The sunroof side rails 11 are connected respectively to the side frames 2 via not-illustrated brackets. A slide groove 12 is formed on a top surface of each of the sunroof side rails 11 to extend along the vehicle front-rear direction, and the front glass panel 9 is slidably supported on the slide groove 12 via a not-illustrated slide mechanism. Moreover, a drain groove 13 is formed on a top surface side of each of the sunroof side rails 11, on the outer side of the slide groove 12 in a vehicle width direction, to extend along the vehicle front-rear direction. Moreover, not-illustrated drain portions are provided in both end portions of each sunroof side rail 11 in the vehicle front-rear direction. The drain portions communicate with the drain groove 13 and discharge water accumulated in the drain groove 13 to the outside of vehicle.

A reinforcement member 18 connecting the left and right side frames 2, 2 to each other are disposed between the rear glass panel 10 and the sunroof side rails 11 in the vehicle up-down direction to extend along the vehicle width direction. Both end portions of the reinforcement member 18 are fastened to brackets 20 by using bolts 19 and the like and the brackets 20 are fastened respectively to inner surfaces of the roof side rail inners 4 of the side frames 2 in the vehicle width direction by using bolts 21 and the like. In the first embodiment, as shown in FIGS. 4 to 5, the reinforcement member 18 is formed in a U-shaped cross section opened on an upper side, and an intermediate portion of the reinforcement member 18 in the vehicle width direction is disposed at an interval from the rear glass panel frame 15 of the rear glass panel 10 in the vehicle up-down direction. Moreover, as shown in FIG. 2, the reinforcement member 18 is formed of a web portion 18a extending along the vehicle width direction, a flange portion 18b formed on the front side of the web portion 18a, and a flange portion 18c formed on the rear side of the web portion 18a. A lower portion of the rear glass panel frame 15 of the rear glass panel 10 is housed in a space defined by the web portion 18a and the flange portions 18b, 18c. Hence, there is formed a structure in which part of the reinforcement member 18 overlaps the rear glass panel frame 15 of the rear glass panel 10.

Moreover, a drain member 22 is disposed between the peripheral portion of the sunroof opening 7 and the reinforcement member 18 in the vehicle up-down direction. The drain member 22 receives water falling from the peripheral portion of the sunroof opening 7 toward an inside of a vehicle cabin and causes the water to flow to the drain groove 13 of each sunroof side rail 11. The drain member 22 has a structure straddling the reinforcement member 18 in the vehicle front-rear direction in the vehicle side view. In the first embodiment, the drain member 22 is formed in a U-shaped cross section opened on the upper side and is formed integrally with the seal retainer 16 of the rear glass panel 10. Specifically, as shown in FIG. 3, the drain member 22 is formed of a web portion 22a extending along the vehicle front-rear direction, a flange portions 22b, 22c formed on both side portions of the web portion 22a in the vehicle width direction. Moreover, the flange portion 22b on the inner side in the vehicle width direction is integral with the seal retainer 16 of the rear glass panel 10.

The sunroof structure for an automobile according to one or more embodiments of the present invention includes: the side frames 2, 2 which are provided respectively in left and right side portions of the vehicle body roof 1 and which extend along the vehicle front-rear direction; the roof panel 6 which is provided between the left and right side frames 2, 2 and which has the sunroof opening 7; the sunroof 8 which is provided in the sunroof opening 7 and has the two glass panels (the front glass panel 9 and the rear glass panel 10) arranged next to each other in the vehicle front-rear direction and in which the front glass panel 9 is configured to be openable and closeable; the sunroof side rails 11, 11 which are provided below the peripheral portion of the sunroof opening 7 to extend in the vehicle front-rear direction and which have the drain grooves 13 and the drain portions configured to discharge water accumulated in the drain grooves 13 to the outside of the vehicle; the reinforcement member 18 which is disposed along the vehicle width direction between the rear glass panel 10 and the sunroof side rails 11 and which connects the left and right side frames 2, 2 to each other; and the drain member 22 which is disposed between the peripheral portion of the sunroof opening 7 and the reinforcement member 18 and which receives water falling from the peripheral portion of the sunroof opening 7 toward the inside of the vehicle cabin and causes the water to flow to the drain groove 13 of each sunroof side rail 11.

According to one or more embodiments of the present invention, rain water falling from the peripheral portion of the sunroof opening 7 is received by the drain member 22 and is then discharged to the outside of the vehicle from the not-illustrated drain portions via the drain groove 13 of each sunroof side rail 11. Accordingly, it is possible to suitably prevent a case where rainwater and the like fall into the vehicle cabin via the reinforcement member 18.

According to one or more embodiments of the present invention, a high level of waterproofness can be maintained in a case of disposing the reinforcement member 18 such as a lateral frame portion traversing the sunroof opening 7 in the vehicle plan view.

According to one or more embodiments of the present invention, providing the reinforcement member 18 connecting the left and right side frames 2, 2 to each other improves the stiffness of the vehicle body. Hence, when impact load is inputted to the vehicle body from a lateral side, the reinforcement member 18 supports the left and right side frames 2, 2 and deformation of a vehicle body upper portion can be thereby suitably suppressed.

According to one or more embodiments of the present invention, the reinforcement member 18 is disposed below the rear glass panel 10 and above the sunroof side rails 11 and is thus not exposed to the inside of the vehicle cabin. Accordingly, appearance is improved and a feeling of spaciousness is provided by securing a space above an occupant.

According to one or more embodiments of the present invention, the drain member 22 is formed in the U-shaped cross section opened on the upper side and is formed integrally with the seal retainer 16 of the rear glass panel 10.

The drain member 22 is formed integrally with the seal retainer 16 of the rear glass panel 10. Hence, there is no need to produce the drain member 22 as an independent part and the number of parts can be thus reduced. Moreover, since work of attaching the drain member 22 to another member is unnecessary, the number of steps for assembling the entire roof can be reduced.

According to one or more embodiments of the present invention, the reinforcement member 18 is formed in the U-shaped cross section opened on the upper side and at least part of the reinforcement member 18 is disposed at an interval from the rear glass panel frame 15 of the rear glass panel 10.

Since the reinforcement member 18 has the U-shaped cross section opened on the upper side, the stiffness of the reinforcement member 18 is improved. Accordingly, when impact load is inputted from a lateral side of the vehicle, the space inside the vehicle cabin can be protected.

Moreover, by employing a structure in which part of the reinforcement member 18 overlaps the rear glass panel frame 15 of the rear glass panel 10, it is possible to secure a gap between the reinforcement member 18 and the sunroof side rails 11 through which the front glass panel 9 passes.

Figure 6:
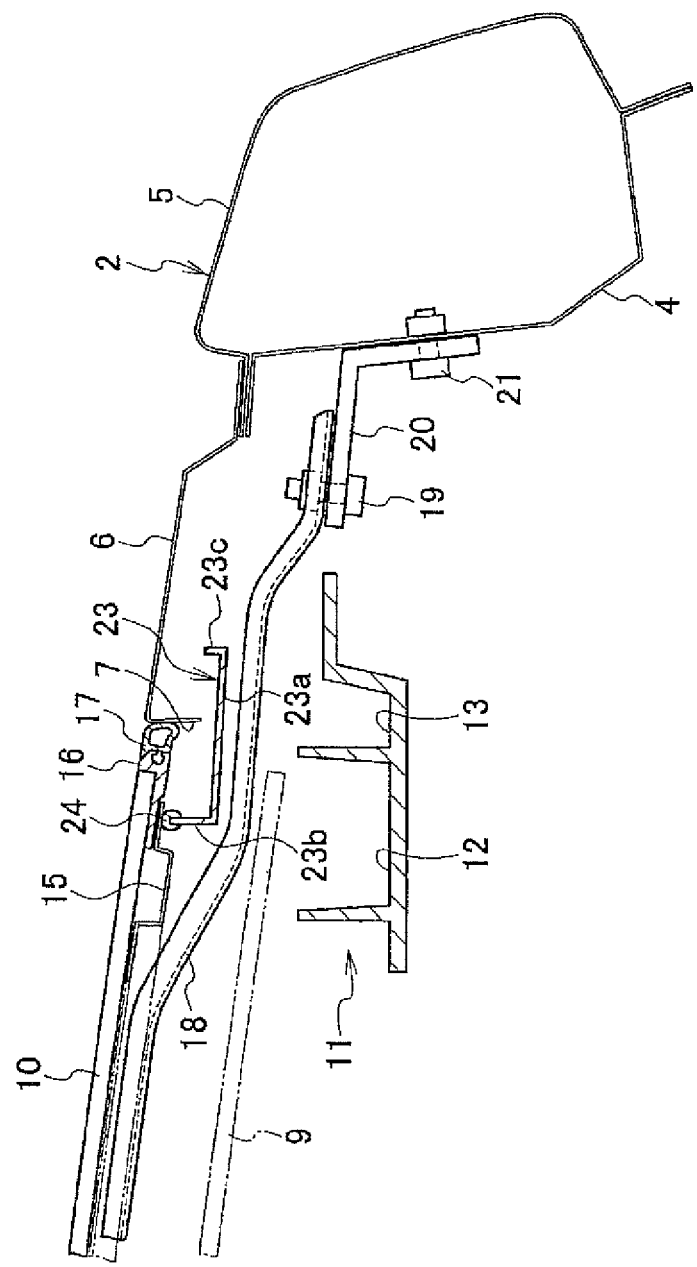
FIG. 6 is a cross-sectional view showing a second embodiment and taken along the line B-B of FIG. 1.

Next, a sunroof structure for an automobile according to a second embodiment of the present invention is described based on FIG. 6. Note that similar parts as those of the first embodiment described above are denoted by the same reference numerals and description thereof is omitted.

As shown in FIG. 6, a drain member 23 in the second embodiment is formed in a U-shaped cross section opened on the upper side and is connected to each of sunroof side rails 11 directly or via a bracket which is another structure. Specifically, the drain member 23 includes a web portion 23a extending along a vehicle front-rear direction and flange portions 23b, 23c formed in both side portions of the web portion 23a in the vehicle width direction. Moreover, a seal 24 configured to seal a gap is interposed between the flange portion 23b on the inner side in the vehicle width direction and a rear glass panel frame 15 of a rear glass panel 10.

In the second embodiment described above, a reinforcement member 18 is disposed above the sunroof side rails 11 and the drain member 23 is disposed above the reinforcement member 18. Accordingly, when impact load is inputted from a lateral side of the vehicle and the reinforcement member 18 deforms to curve upward or downward, the reinforcement member 18 abuts the drain member 23 or the sunroof side rails 11. In this case, since the drain member 23 and the sunroof side rails 11 are connected to each other, joining strength between these parts are increased. Hence, the reinforcement member 18 deforming to curve is effectively held down by the drain member 23 or the sunroof side rails 11 and deformation of the reinforcement member 18 can be thereby suppressed.

The stiffness of the vehicle body in the case when impact load is inputted to a vehicle body from a lateral side can be thus improved.

Although the sunroof structure for an automobile has been described by giving the first and second embodiments as examples, the present invention is not limited to these embodiments and various other embodiments are within a scope of the present invention. For example, the sunroof may be one which has three or more glass panels arranged next to each other in the vehicle front-rear direction. Moreover, the drain member may be attached to the reinforcement member.

The present disclosure relates to subject matters contained in Japanese Patent Application. No. 2013-191317, filed on Sep. 17, 2013, the disclosures of which is expressly incorporated herein by reference in its entirety.

The sunroof structure for an automobile according to one or more embodiments of the present invention has the drain member. The drain member is disposed between the peripheral portion of the sunroof opening and the reinforcement member. The drain member receives water falling from the peripheral portion of the sunroof opening toward the inside of the vehicle cabin and causes the water to flow to the drain groove of each sunroof side rail. Due to this, the sunroof structure has an effect that a high level of waterproofness carne maintained in a case of disposing a reinforcement member such as a lateral frame portion traversing the sunroof opening in the vehicle plan view.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A sunroof structure for a vehicle, comprising:
    a left side frame disposed on a left side of a vehicle body roof, extending along a vehicle front-rear direction;
    a right side frame disposed on a right side of the vehicle body roof, extending along the vehicle front-rear direction;
    a roof panel disposed between the left side frame and the right side frame, comprising a sunroof opening;
    a sunroof disposed in the sunroof opening and comprising at least two glass panels arranged next to each other in the vehicle front-rear direction, in which at least a foremost glass panel of the at least two glass panels is configured to be openable and closeable;
    a sunroof side rail disposed below a peripheral portion of the sunroof opening, extending along the vehicle front-rear direction, and comprising a drain groove and a drain portion configured to discharge water accumulated in the drain groove to an outside of the vehicle;
    a reinforcement member disposed along a vehicle width direction between the sunroof side rail and a rearmost glass panel of the at least two glass panels, which connects the left side frame to the right side frame; and
    a drain member disposed between the peripheral portion of the sunroof opening and the reinforcement member, which receives water falling from the peripheral portion of the sunroof opening toward an inside of a vehicle cabin of the vehicle, and causes the water to flow to the drain groove of the sunroof side rail.

2. The sunroof structure according to claim 1, wherein the drain member is formed in a U-shaped cross section opened on an upper side and is formed integrally with a seal retainer configured to hold a seal for the glass panel on the rear side.

3. The sunroof structure for an automobile according to claim 1, wherein the drain member is formed in a U-shaped cross section opened on an upper side and is connected to the sunroof side rail.

4. The sunroof structure according to claim 1, wherein the reinforcement member is formed in a U-shaped cross section opened on an upper side and at least part of the reinforcement member is disposed at an interval from a frame-shaped glass panel frame provided on a bottom surface of the glass panel on the rear side.

5. The sunroof structure according to claim 2, wherein the reinforcement member is formed in a U-shaped cross section opened on an upper side and at least part of the reinforcement member is disposed at an interval from a frame-shaped glass panel frame provided on a bottom surface of the glass panel on the rear side.

6. The sunroof structure according to claim 3, wherein the reinforcement member is formed in a U-shaped cross section opened on an upper side and at least part of the reinforcement member is disposed at an interval from a frame-shaped glass panel frame provided on a bottom surface of the glass panel on the rear side.

\* \* \* \* \*